United States Patent
Jochemsen et al.

(10) Patent No.: US 6,757,804 B2
(45) Date of Patent: Jun. 29, 2004

(54) METHOD AND SYSTEM FOR REDUCING FRAGMENTATION

(75) Inventors: Robert Jochemsen, Eindhoven (NL); Nicolaas Lambert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 201 days.

(21) Appl. No.: 10/028,123

(22) Filed: Dec. 21, 2001

(65) Prior Publication Data

US 2002/0133683 A1 Sep. 19, 2002

(30) Foreign Application Priority Data

Dec. 22, 2000 (EP) .............................. 00204793

(51) Int. Cl.[7] .............................................. G06F 12/02
(52) U.S. Cl. ...................................................... 711/170
(58) Field of Search ................................ 711/154, 112, 711/170; 707/200, 205, 206

(56) References Cited

U.S. PATENT DOCUMENTS

| | | | |
|---|---|---|---|
| 5,574,907 A | 11/1996 | Jernigan, IV et al. | 398/601 |
| 5,930,828 A | 7/1999 | Jensen et al. | 711/170 |
| 5,944,839 A * | 8/1999 | Isenberg | 714/26 |
| 6,092,105 A * | 7/2000 | Goldman | 709/217 |
| 6,202,121 B1 * | 3/2001 | Walsh et al. | 711/100 |

FOREIGN PATENT DOCUMENTS

WO     WO9737313     3/1997

OTHER PUBLICATIONS

McDonald et al, "Improving File System Performance by Dynamically Restructuring Disk Space", 1989, IEEE, p 264–269.*

Gregory Booi, "How to Improve MEBES–III", Write Times by Improving Your MEBES–III Management Discipline, Enabled by High–Speed Networking Software,A.B. Networks, Inc., Mill Valley CA.

* cited by examiner

Primary Examiner—Kevin L. Ellis

(57) ABSTRACT

The present invention provides a method and system for reducing fragmentation (both file fragmentation and free-space fragmentation) in digital storage devices (10). In such a device in which a plurality of files is available for deletion the invention proposes selectively deleting the file that maximises defragmentation. The selection may optimise file and free-space defragmentation.

10 Claims, 2 Drawing Sheets

METHOD AND SYSTEM FOR REDUCING FRAGMENTATION

The present invention relates to methods of and systems arranged for reducing fragmentation. The invention also relates to corresponding computer program products.

A digital storage device is typically a disk on which data is stored. The present invention is concerned with such storage devices in which the data storage is potentially temporary, i.e. data is deletable.

When data, in the form of files, is stored to such a disk it is done so that each file is independently accessible. The files are stored on tracks arranged concentrically on the disk. The location on the disk at which a particular file is located is stored in a separate data structure in a disk management file.

Files are saved to the disk in one or more fragments. A fragment contains part or all of a file. When a large file is to be stored on the disk, several fragments may be required. Depending on the available space on the disk the fragments may be scattered around the disk surface. If the disk is near its capacity for data storage, even a relatively small file may have to be split into spaced fragments.

This spacing of fragments of a file is referred to as file fragmentation. When the free space between fragments becomes fragmented, this is referred to as free-space fragmentation. A highly fragmented disk generally will take longer to read as the read device needs to hunt around the disk to find the relevant fragments. Similarly it can take longer for a file to be saved to a highly fragmented disk as the write device needs to find sufficient fragments for all of the file(s), which clusters may be widely spaced. File fragmentation and free-space fragmentation are together referred to as fragmentation.

Various approaches have been tried to reduce fragmentation of such a memory device, for instance as disclosed in U.S. Pat. No. 5,930,828. In this prior art proposal files are moved around the disk to reduce fragmentation. This is time consuming and processor intensive.

In recent digital devices such as disk based digital video recorders using a file system, it is often the case that a file is to be deleted. For instance, a user may pre-select files for deletion (similar to a "recycle bin" in a WINDOWS (trade mark) operating system environment) or files may be annotated only to be kept for a certain period of time. Such annotation is recorded in the system file manager usually by a marker flag. In this case there may be a plurality of files available for deletion when a delete operation needs to be carried out, for instance, to create space for a new file to be saved.

When a delete operation is necessary, it is desireable permanently to delete the minimum number of files so that (a) at least the required amount of free space is created; and (b) defragmentation and free-space defragmentation are optimised.

It is an aim of preferred embodiments of the present invention to provide a method, system and corresponding computer program product for reducing fragmentation of a digital storage device.

According to the present invention in a first aspect, there is provided a method of reducing fragmentation of a digital storage device, characterised by the method comprising the steps of:
  determining that a plurality of files is available for deletion;
  selecting one of the files; and
  deleting the selected file and not deleting another of the files.

According to the present invention in a second aspect, there is provided a system arranged for reducing fragmentation of a digital storage device, characterised by the system comprising means for determining that a plurality of files is available for deletion; means for selecting one of the files; and means for deleting the selected file and not deleting another of the files.

It has been realised that with digital storage devices annotating a plurality of files for deletion, there is an efficient opportunity to reduce fragmentation by selective file deletion.

The present invention will now be described, by way of example only, with reference to the drawings that follow; in which.

Figure 2:
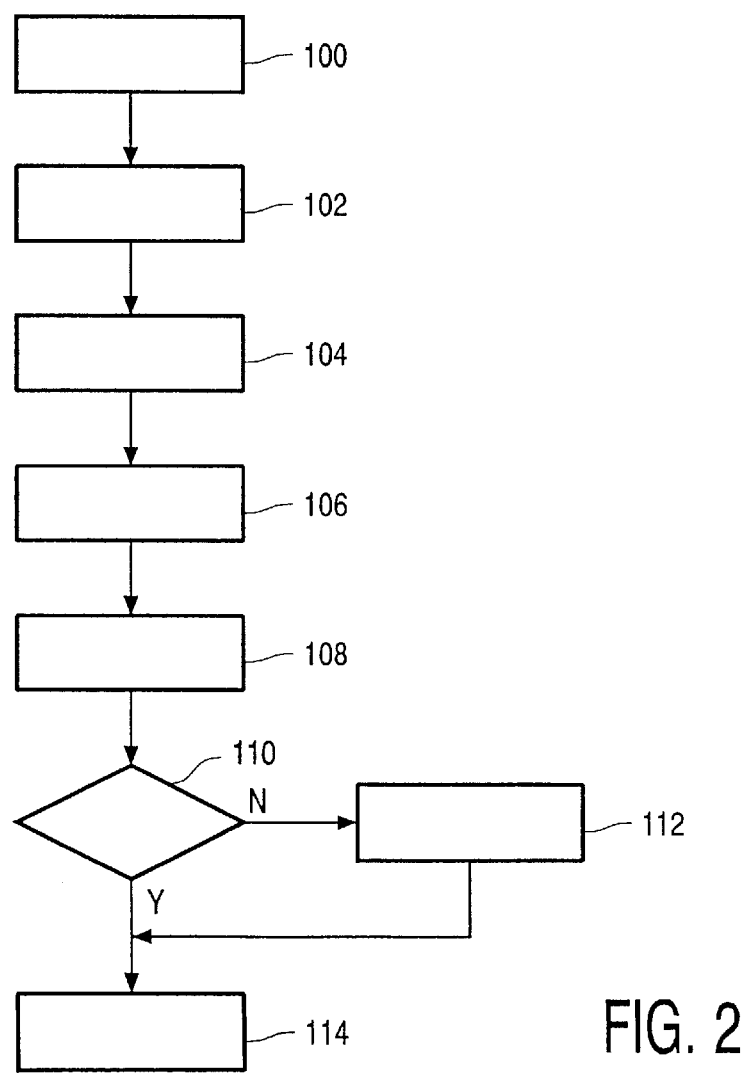
FIG. 2 is a functional flow diagram illustrating a file writing operation.
Figure 3:
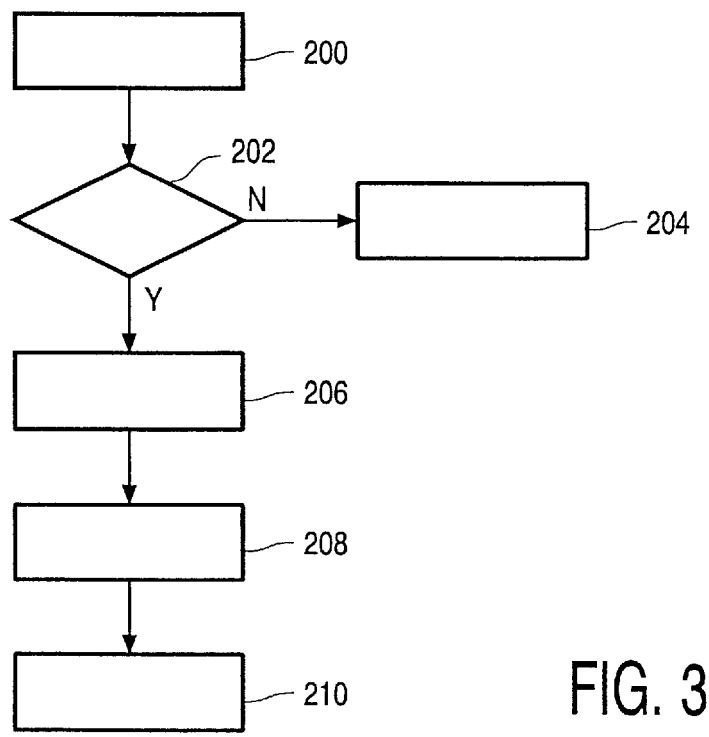
FIG. 3 is a functional flow diagram illustrating a file deleting operation according to an embodiment of the present invention.
Figure 4:
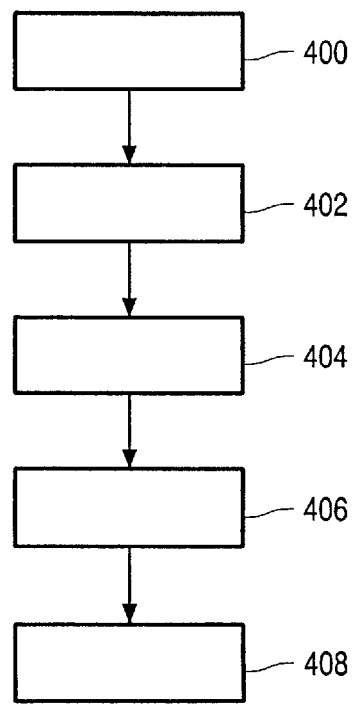
FIG. 4 is a functional flow diagram illustrating a file selecting operation according to an embodiment of the present invention.

Some of the features indicated in FIGS. 2-4 of the drawings are typically implemented in software, and as such represent software entities, such as software modules or objects.

Figure 1:
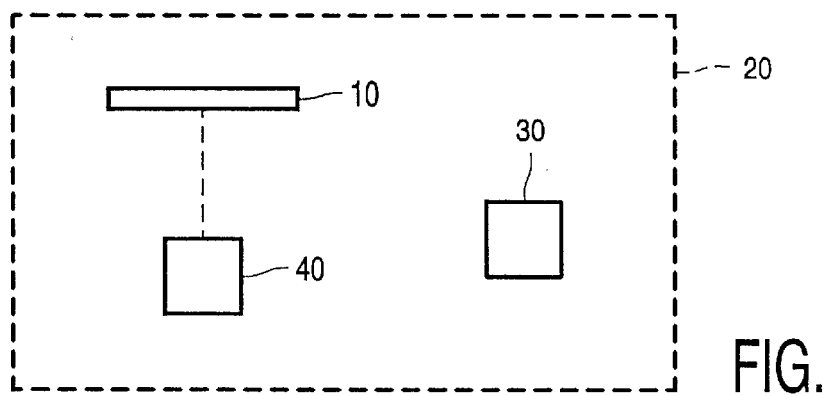
FIG. 1 is a schematic illustration of a digital video recorder.

Referring to FIG. 1 of the drawings that follow, there is shown schematically a memory disk 10 of a digital video recorder 20, which digital video recorder has a file manager 30 for controlling files on the disk 10. The memory disk 10 has an associated computer program product 40 for operating the digital video recorder according to preferred embodiments of the present invention.

Referring to FIG. 2 of the drawings that follow, the steps of a file writing operation are shown. In FIG. 2, the flow diagram entries correspond as follows:

| | |
|---|---|
| 100 | SELECT FILE TO WRITE TO DISK |
| 102 | SEARCH FOR AVAILABLE FOR SPACE ON DISK |
| 104 | SEGMENT FILE INTO REQUIRED CLUSTERS |
| 106 | WRITE CLUSTERS TO DISK |
| 108 | GENERATE FILE MANAGER ENTRY |
| 110 | IS FILE TO BE ANNOTATED FOR DELETION? |
| 112 | ANNOTATE FILE MANAGER ENTRY |
| 114 | FINISH |

In step 100 a file (not shown) is selected to be written to the disk 10.

Once a file is selected to write to disk 10 (step 100), for instance by a user or automatic save instruction, a search of the file manager 30 is undertaken for available free space on the disk 10 (step 102). In this case we assume that there is sufficient space on the disk 10, but that it is fragmented to some degree. Accordingly, the file to be written is segmented into the required number and size of fragments (step 104) and is then written to the disk 10 (step 106). To maintain a record of the file, a file manager entry is generated (step 108) in the file manager 30. The file may be annotated for deletion at this stage or it may be so annotated later (step 110). Annotation is typically by a marker flag on the file manager entry for the file. If it is to be annotated then the corresponding file manager entry is annotated accordingly (step 112). A file may be annotated for deletion after a certain period of time, or may be user selected for deletion, for instance by being placed in a recycle bin or the like (in a WINDOWS (trade mark) operating system environment). Given the set or a subset of the files on the disk, a mechanism can mark a number of these for deletion, according to a user profile.

Thus, when a file is to be deleted there may be several such files available. A file may need to be deleted for instance to make room on the disk for a write operation that has been instructed. Alternatively, the user may instruct an amount of the free space to be cleared.

FIG. 3 of the drawings that follow shows a deletion operation according to an embodiment of the present invention. In FIG. 3, the flow diagram entries correspond as follows:

| | | |
|---|---|---|
| 200 | INITIATE DELETE OPERATION | |
| 202 | MULTIPLE FILES AVAILABLE FOR DELETION? | |
| 204 | DELETE SINGLE FILE | |
| 206 | SELECT FILE TO DELETE TO REDUCE FRAGMENTATION | |
| 208 | DELETE SELECTED FILE | |
| 210 | UPDATE FILE MANAGER | |

When a deletion operation is initiated (step 200) the file manager 30 is interrogated (step 202) to determine whether multiple files are available for deletion. A file is available for deletion if it has been so annotated. A file is only available for deletion if in doing so it provides sufficient free-space for the required write operation. This may mean that several of a plurality of files need to be deleted. If only a single file is available for deletion, it is deleted (step 204) and the file manager 30 updated accordingly (step 210). If multiple files are available a file is selected to be deleted to reduce fragmentation (step 206). Options for selecting the file to be deleted in this embodiment of the present invention are set out below. Next the selected file is permanently deleted (step 208) and the file manager 30 is updated accordingly (step 210).

Once it has been determined that multiple files are available for deletion, the specific file to be deleted can be chosen to optimise file defragmentation or free-space defragmentation. There can be several criteria to determine the text file to delete. One is to optimise the file fragmentation level of the files on the disk by deleting the most fragmented file among the available candidates for deletion. A better one is to optimise the fragmentation level and the free-space fragmentation level, since the next file to be written to the disk will benefit from a low free-space fragmentation.

The optimisation can be improved by taking into account not only the number of fragments, but also the sizes of them.

It is also possible to achieve an even lower fragmentation level by selecting an allocation strategy and deletion strategy that tries to optimise the fragmentation and free space fragmentation level together.

Consider the following (simplified) file system with three files on it, and some free space left.

| A | C | F | A | A | F | B | C | B | C | B |
|---|---|---|---|---|---|---|---|---|---|---|

File A consists of 2 fragments, file B of 3 fragments, and file C of 3 fragments. The free space F consists of 2 fragments. Thus in total there are 10 fragments.

Suppose files A and B are candidates for deletion having been annotated accordingly in the file manager 30, and file C should be left untouched, we need to choose between files A and B for deletion. If we delete the most file fragmented one, which is file B, we get the following result:

| A | C | F | A | A | F | F | C | F | C | F |
|---|---|---|---|---|---|---|---|---|---|---|

File A consists of 2 fragments, file C of 3 fragments, and the free space F of 4 fragments. This totals 9 fragments. Because of the high fragmentation of the free space, the next file to be stored will probably have a high fragmentation level as well. If instead we optimise on the file fragmentation level of both the files and the free-space, we would delete file A, from which we get the following result:

| F | C | F | F | F | F | B | C | B | C | B |
|---|---|---|---|---|---|---|---|---|---|---|

File B consists of 3 fragments, file C of 3 fragments and the free space F consists of 2 fragments, totalling 8 fragments. What is more, since the free-space has a low free-space fragmentation level, the next file to be stored will also have a low fragmentation level.

The determination of which file to delete whichever selection option is chosen is carried out by interrogating the file manager 30. For every file in a set of deletable files the effect of deletion on file fragmentation and free-space fragmentation is calculated.

The selection process is shown in FIG. 4 of the drawings that follow. The entries in the flow diagram correspond as follows:

| | |
|---|---|
| 400 | FOR EACH FILE CALCULATE FILE FRAGMENTATION EFFECT OF DELETION |
| 402 | FOR EACH FILE CALCULATE FREE-SPACE FRAGMENTATION EFFECT OF DELETION |
| 404 | FOR EACH FILE DETERMINE SUM OF FILE FRAGMENTATION AND FREE-SPACE FRAGMENTATION |
| 406 | NORMALISE SUM CALCULATION ACCORDING TO NUMBER OF CLUSTERS |
| 408 | SELECT OPTIMAL FILE |

The effect on free-space fragmentation is calculated by calculating the changes the deletion (for each file) would have on the free-space fragments (step 402). New free-space fragments might appear (undesirable), but several free-space fragments can be connected by deletion creating new free-space fragments (desirable). In general, the number of free-space fragments will increase (i.e. a positive change).

The file that results in the lowest sum (always zero or negative) of both the fragmentation and free-space fragmentation changes is determined (step 404).

Since this mechanism favours large files (being statistically more coalescing), an optional refinement is to normalise on the file size (step 406). This is done by dividing the sum above by the number of clusters in the file. The optimal file is then selected (step 408).

Alternatively, the result from step 404 can be used to select the file for deletion.

For each file available for deletion, the effect of deletion on file fragmentation is calculated (step 400). File fragmentation over the completed disk would decrease by the number of fragments of the file to be deleted. This is always a negative change.

What is claimed is:

1. A method of reducing fragmentation of a digital storage device (10), the method comprising the steps of:

determining that a plurality of files is available for deletion (202);

selecting one of the files (206); and deleting the selected file (208) and not deleting another of the files;

wherein the selecting step comprises selecting the most file fragmented file for deletion.

2. A method of reducing fragmentation of a digital storage device, the method comprising the steps of:

determining that a plurality of files is available for deletion (202);

selecting one of the files (206); and deleting the selected file (208) and not deleting another of the files;

wherein the selecting step comprises the steps of:

determining which file deletion will optimise file defragmentation and free space defragmentation (400, 402, 404); and selecting the determined file for deletion (408).

3. A method of reducing fragmentation of a digital storage device according to claim 2, in which the selecting step comprises the sub-steps of:

calculating for each file available for deletion the effect on file fragmentation of its deletion (400);

calculating for each file available for deletion the effect on free-space fragmentation of its deletion (402); and determining which file available for deletion results in the lowest sum from (400) and (402) (404).

4. A method of reducing fragmentation of a digital storage device according to claim 3 in which the sum is normalised according to the file size (406).

5. A system arranged for reducing fragmentation of a digital storage device (10), comprising means for determining that a plurality of files is available for deletion; means for selecting one of the files; means for deleting the selected file and not deleting another of the files; and means for selecting the most file fragmented file for deletion.

6. A system arranged for reducing fragmentation of a digital storage device (10), comprising means for determining that a plurality of files is available for deletion; means for selecting one of the files; means for deleting the selected file and not deleting another of the files; means for determining which file deletion will optimise file defragmentation and free space defragmentation; and means for selecting the determined file for deletion.

7. A system arranged for reducing fragmentation of a digital storage device (10) according to claim 6, in which the means for determining which file deletion will optimise file defragmentation and free space defragmentation comprises:

means for calculating for each file available for the deletion effect on file fragmentation of its deletion;

means for calculating for each file available for the deletion effect on free-space fragmentation of its deletion; and means for determining which file available for deletion results in the lowest sum from the deletion effect on file fragmentation and free space fragmentation.

8. A system arranged for reducing fragmentation of a digital storage device (10) according to claim 7, which further comprises means to normalise the sum according to the file size.

9. A system arranged for reducing fragmentation of a digital storage device according to claim 5, in which the system comprises a digital video recorder.

10. A computer program product arranged to cause a processor to execute a method according to claim 1.

* * * * *